Sept. 22, 1925.
W. R. HEROD
1,554,674
CONTROL SYSTEM
Filed Nov. 2, 1923
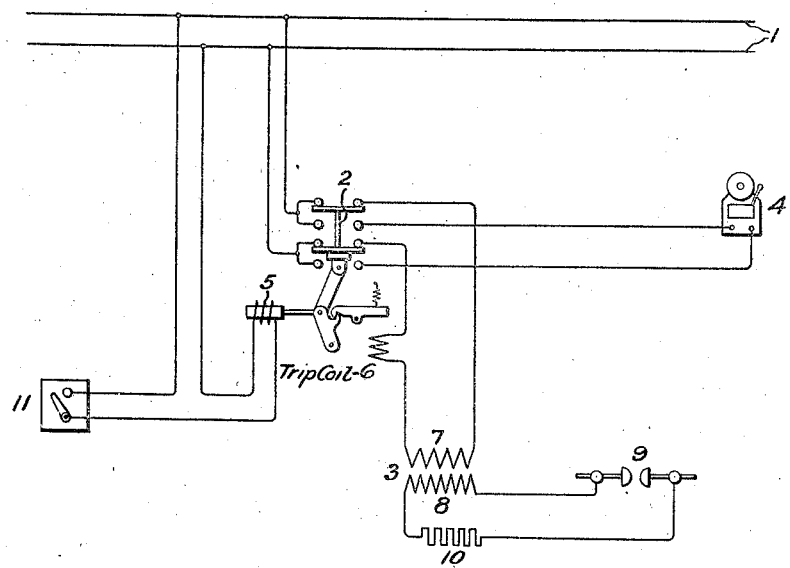
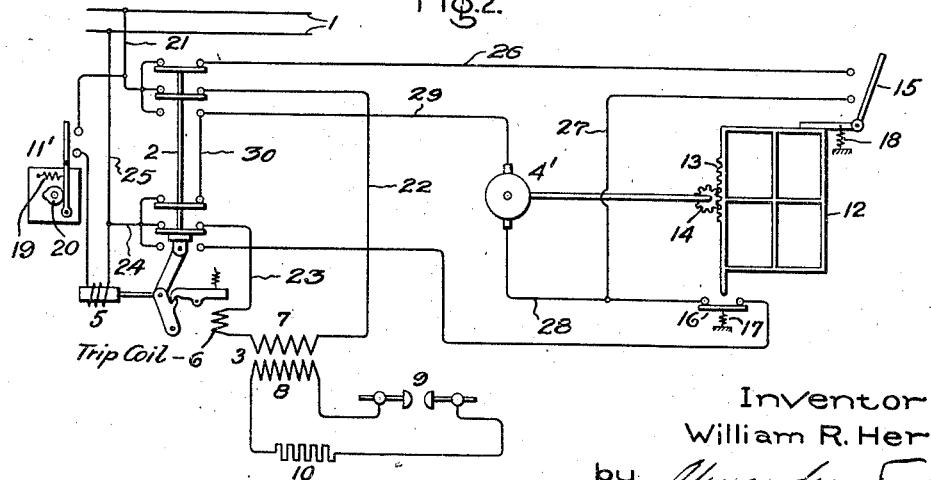
Inventor:
William R. Herod;
by Alexander F. ____
His Attorney.

Patented Sept. 22, 1925.

1,554,674

UNITED STATES PATENT OFFICE.

WILLIAM R. HEROD, OF SCHENECTADY, NEW YORK, ASSIGNOR TO GENERAL ELECTRIC COMPANY, A CORPORATION OF NEW YORK.

CONTROL SYSTEM.

Application filed November 2, 1923. Serial No. 672,446.

*To all whom it may concern:*

Be it known that I, WILLIAM R. HEROD, a citizen of the United States, residing at Schenectady, in the county of Schenectady, State of New York, have invented certain new and useful Improvements in Control Systems, of which the following is a specification.

My invention relates to control systems, and has for its object the provision of a control system arranged to produce energization of one or more devices in response to change in the humidity of the atmosphere.

It is well known that the spark-over voltage of a sphere gap varies with the amount of moisture in the atmosphere and that in the presence of rain, for example, it may be reduced to fifty per cent or less of the dry gap spark-overvoltage. I propose to utilize this characteristic of a spark gap for the purpose of automatically controlling energization of a translating device, for example, a motor, solenoid, lamp or indicator, in accordance with the humidity of the atmosphere. My invention has particular utility when utilized for the purpose of automatically closing windows in response to the precipitation of rain, but obviously is not limited to such use since it may be used in any case where it is desired to perform an operation in response to a variation in humidity. As used throughout the specification and claims the term humidity is intended to include all water suspended in the atmosphere whether it be in the form of vapor or in the form of falling rain.

My invention will be better understood on reference to the following description when considered in connection with the accompanying drawing and its scope will be pointed out by the appended claims.

Referring now to the drawing, Figure 1 shows a system of control in which my invention has been embodied, and Fig. 2 shows a modification thereof.

Fig. 1 shows a source of electricity 1 from which current may be supplied through a switch 2 either to a transformer 3, when the switch is closed in its upper position, or to a translating device 4, illustrated as a bell, when the switch is in its lower closed position. The switch 2, which may be of any suitable form, is shown as provided with electroresponsive means illustrated as a solenoid 5 for moving it to its upper closed position and with a trip coil 6 for disengaging a catch by which it is held in this position. The trip coil 6 is connected in series with the primary winding 7 of the transformer 3. In series with the secondary winding 8 of the transformer 3 is connected a sphere gap 9 and current limiting means 10 indicated as a resistor. When the switch 2 is closed in its upper position a potential difference is maintained across the spark gap 9. The gap 9 is adjusted to preclude the establishment of an arc under normal conditions but is arranged to discharge in response to a predetermined increase in the moisture of the atmosphere. A switch 11 may be provided for controlling energization of the solenoid 5 as desired.

Assuming the various switches to be in the positions illustrated, the system is operated in response to a discharge across the gap 9 as follows: Due to the flow of electricity in the secondary circuit of the transformer 3, its primary current is increased to a value at which the coil 6 trips the switch 2 which in moving to its lower closed position disconnects the transformer 3 from the source 1 and connects thereto the indicating device 4. The switch 2 may be returned to its upper closed position by operation of the switch 11 through which the solenoid 5 is connected to the source 1.

The system of Fig. 1 may be rearranged to control the position of a window in accordance with the operation of a humidity responsive device as indicated in Fig. 2. In accordance with this modification means are provided for closing the window when the humidity of the atmosphere exceeds a predetermined value and for periodically arranging the system to reopen the window, the actual opening of the window, however, being delayed until the moisture content of the air has decreased to a value at which the humidity responsive means is ineffective to affect the operation of the system.

Fig. 2 shows a system which differs from that shown in Fig. 1 in that the switch 11' is biased to open position by means illustrated as a spring 19 and is arranged in well known manner to be periodically closed for intervals of time only sufficiently long to permit closure of the switch 2 in its upper closed position by the solenoid 5, the bell 4 is replaced by a motor 4', and the switch 2 has been provided with an additional set of contacts for the purpose of reversing the connections between the line 1 and the motor 4'. A window 12 is operatively associated with the system as diagrammatically indicated by the rack 13 and pinion 14. Suitable limit switches 15 and 16 may be provided for disconnecting the motor from the source of current when the window has reached the limit of its travel in either direction.

With the switches arranged in normal operating position, as shown in Fig. 2, a discharge across the gap 9 energizes the trip coil 6 thereby tripping the switch 2 which in its lower closed position connects the motor 4' to the line 1 for operation in a direction to lower the window 12. In the closed position of the window the motor is deenergized due to opening of the switch 16 which has been illustrated as biased to closed position by a spring 17. In moving to closed position, the window permits closure of the switch 15 which is also indicated as biased to closed position by a spring 18. Under these conditions closure of the switch 11', which may be arranged to be periodically closed by a cam 20 operated by a clockwork or other suitable means, connects the transformer 3 and the motor 4' to the line 1 in parallel, the transformer being connected to the line through conductor 21, switch 2, conductor 22, trip coil 6 and conductors 23, 24 and 25 and the motor 4' now being connected to the line through conductor 21, switch 2, conductor 26, switch 15, conductors 27, 28, 29, 30, 24 and 25 for operation in a direction to raise the window. In order to prevent opening of the window while it is raining it is important that the switch 11' remain in closed position only long enough to permit closure of the switch 2 in its upper closed position. With these connections a discharge across the gap 9 will cause the switch 2 to move immediately to its lower closed position thereby preventing opening of the window. In the absence of a discharge across the gap 9, however, the window will be raised to its upper position and the circuit of the motor will be interrupted by the switch 15.

While my invention has been illustrated and described as utilized in connection with an indicating device and as arranged for operating a window it is obviously useful wherever it is desired to perform automatically an operation or series of operations in response to change in the humidity of the atmosphere. I accordingly do not wish to be restricted to the particular form of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. In a humidity responsive apparatus, a device to be operated, a spark gap arranged to discharge in response to a change in the humidity of the atmosphere, and means operable in response to a discharge across said gap for controlling the operation of said device.

2. An electric control system comprising a device to be operated, a spark gap arranged to discharge in response to change in the humidity of the atmosphere, means whereby a potential difference may be impressed across said spark gap and means whereby a discharge across said spark gap controls the operation of said device.

3. An electric control system comprising a device to be operated, a spark gap arranged to discharge in response to change in the humidity of the atmosphere, switching means arranged in normal position to complete a circuit for impressing a potential difference across said spark gap and operable to another position to complete a circuit for controlling the operation of said device and means operable in response to a discharge across said spark gap for moving said switching means from normal position to the other position.

4. An electric control system comprising a device to be operated, a spark gap arranged to discharge in response to change in the humidity of the atmosphere, switching means arranged in one position to complete a circuit for energizing said spark gap and operable in another position to complete a circuit to control the operation of said device, means operable in response to a discharge across said spark gap to cause said switching means to move to deenergize said spark gap and complete the circuit for controlling said device and means for periodically moving said switching means into the position to energize said spark gap.

5. An electric control system comprising a device to be operated in one direction or the other, a spark gap arranged to discharge in response to change in the humidity of the atmosphere, switching means arranged normally to complete a circuit for operating said device in one direction and to complete a circuit for impressing a potential difference across said spark gap, means operable upon a discharge across said spark gap for moving said switching means to deenergize said spark gap and to complete a circuit for operating said device in the other direction, electroresponsive means adapted to be energized to restore said switching means to normal position and means for periodically energizing said electroresponsive means.

In witness whereof, I have hereunto set my hand this 1st day of November, 1923.

WILLIAM R. HEROD.